(12) United States Patent
Lindteigen et al.

(10) Patent No.: US 9,055,440 B2
(45) Date of Patent: Jun. 9, 2015

(54) GEOSPATIAL CRYPTOGRAPHY

(71) Applicants: Ty Brendan Lindteigen, Chandler, AZ (US); James Chester Jones, Chandler, AZ (US)

(72) Inventors: Ty Brendan Lindteigen, Chandler, AZ (US); James Chester Jones, Chandler, AZ (US)

(73) Assignee: SAIFE, Inc. AZ (US)

( * ) Notice: Subject to any disclaimer, the term of this patent is extended or adjusted under 35 U.S.C. 154(b) by 0 days.

(21) Appl. No.: 13/656,231

(22) Filed: Oct. 19, 2012

(65) Prior Publication Data

US 2014/0112472 A1    Apr. 24, 2014

(51) Int. Cl.
| | |
|---|---|
| H04W 12/06 | (2009.01) |
| H04L 9/08 | (2006.01) |
| H04W 4/02 | (2009.01) |
| H04L 29/06 | (2006.01) |
| H04W 84/12 | (2009.01) |

(52) U.S. Cl.
CPC ............ *H04W 12/06* (2013.01); *H04L 9/0872* (2013.01); *H04W 4/021* (2013.01); *H04L 63/107* (2013.01); *H04W 84/12* (2013.01)

(58) Field of Classification Search
CPC ... H04L 63/107; H04L 9/0872; H04W 12/06; H04W 12/08; H04W 84/12
USPC .............................................. 726/3; 380/247
See application file for complete search history.

(56) References Cited

U.S. PATENT DOCUMENTS

| | | | | |
|---|---|---|---|---|
| 6,674,403 | B2 * | 1/2004 | Gray et al. ..................... 342/463 |
| 7,042,852 | B2 * | 5/2006 | Hrastar ......................... 370/310 |
| 7,058,358 | B2 * | 6/2006 | Cannon et al. ................ 455/41.2 |
| 7,551,574 | B1 * | 6/2009 | Peden et al. ................. 370/310.2 |
| 7,898,977 | B2 * | 3/2011 | Roese et al. ................... 370/254 |
| 2003/0216144 | A1 * | 11/2003 | Roese et al. ................. 455/456.1 |
| 2005/0117750 | A1 * | 6/2005 | Rekimoto ...................... 380/247 |
| 2007/0053306 | A1 * | 3/2007 | Stevens ......................... 370/252 |
| 2007/0186106 | A1 * | 8/2007 | Ting et al. ..................... 713/168 |
| 2010/0048222 | A1 * | 2/2010 | Gracieux ..................... 455/456.1 |
| 2010/0285817 | A1 * | 11/2010 | Zhao et al. ................. 455/456.3 |
| 2011/0004659 | A1 * | 1/2011 | Arumaithurai et al. ....... 709/203 |

OTHER PUBLICATIONS

Newbury Networks Products: Location Tracking and WLAN Detection © 2006 Newbury Networks (2 pages) http://web.archive.org/web/20070210070722/www.newburynetworks.com/products-wlan_detection.htm.*
"Newbury Networks Enterprise WLAN Perimeter Security." Published Feb. 10, 2007 as verified by the Internet Archive (4 pages) http://web.archive.org/web/20070210011531/http://www.newburynetworks.com/6055360026185462700692592 06/Link.htm.*
Henderson, Tom. "Newbury Network's WiFi Watchdog", Network World Lab Alliance, Network World, Mar. 15, 2004 (4 pages) http://www.networkworld.com/techinsider/2004/0315techinsiderrev.html.*

* cited by examiner

*Primary Examiner* — Joseph P Hirl
*Assistant Examiner* — Thomas Gyorfi

(57) ABSTRACT

The invention includes methods for cryptographically authenticating access between devices when the devices are within a geospatial boundary comprising the first step of keeping track of the physical position of the devices using both low and, or high fidelity geospatial positioning techniques. Next, a first device determines whether any nearby mobile devices have entered the geospatial boundary. Next, the first device determines if any of the mobile devices are peers eligible for cryptographic authentication. After the first device authenticates that the other device within the geospatial boundary is a trusted peer, the devices may perform various data and, or dynamic policy operations.

21 Claims, 16 Drawing Sheets

GEOSPATIAL CRYPTOGRAPHY

FIELD OF THE INVENTION

This invention relates generally to the field of electronic data processing, and particularly a method and system to electronically protect, transfer, and transform data using geospatial cryptography techniques.

BACKGROUND OF THE INVENTION

The protection of electronic data is increasingly vital for governments, corporate entities, and private individuals. Failure to protect such data may result in immeasurable damage to governments, corporate entities, and private individuals. Such damage may manifest in billions of dollars lost from the disclosure of a company's trade secrets, inadvertent release of secret intelligence information, or disclosure of an individual's private information.

Governments, corporate entities, and individuals rely heavily on mobile and fixed electronic devices to electronically process data. Users of such electronic devices are challenged to protect data while executing various operations such as electronically gathering, storing, processing, transferring, and purging data. Such users must also be able to identify other trusted users to perform various data and, or dynamic policy operations. The prolific use of electronic devices to perform data and, or dynamic policy operations escalate the need for robust cryptographic methods and systems to gather, protect, store, process, and transfer data.

Geospatial cryptography techniques provide a robust and secure approach for users of electronic devices to identify trusted users to perform data and, or dynamic policy operations. Geospatial cryptography refers to the automatic or non-automatic application of data gathering, protection, storage, processing, transferring, and transformation operations in response to the changing physical position of the secure electronic devices. The physical position of electronic devices can be determined using several methods including Geospatial Positioning System ("GPS") position, IP infrastructure, or beacon techniques.

This invention provides a novel method for multiple electronic devices to cryptographically authenticate access prior to performing data and, or dynamic policy operations. The electronic devices may be enabled to autonomously exchange data and, or dynamic policy operations after establishing cryptographic authentication, or such operations may be controlled by a remote control agent. This invention further allows for cryptographic authentication based on physical location combined with other parameter such as temporal, certificates, and biometrics.

BRIEF SUMMARY OF THE INVENTION

In one embodiment of the invention, cryptographically authenticating access between at least one fixed electronic device and any number of mobile electronic devices within a geospatial boundary comprises the first step of keeping track of the physical position of the mobile electronic devices using both low and, or high fidelity geospatial positioning techniques. Next, the fixed electronic device determines whether any nearby mobile electronic devices have entered a geospatial boundary surrounding the fixed device. Next, the fixed device determines if any of the mobile electronic devices are peers eligible for cryptographic authentication. After the fixed electronic device authenticates mobile electronic devices within the geospatial boundary, the devices may perform various data and, or dynamic policy operations.

In another embodiment of the invention, cryptographically authenticating access between any number of mobile electronic devices within a geospatial boundary comprises the first step of keeping track of the physical position of the electronic devices using both low and, or high fidelity geospatial positioning techniques. Next, a first mobile electronic device determines whether it is within a geospatial boundary. Next, the first mobile electronic device determines if there are any other mobile electronic devices that are peers eligible for cryptographic authentication. After the first mobile electronic device authenticates another mobile electronic device, the devices may perform various data and, or dynamic policy operations.

In another embodiment of the invention, cryptographically authenticating access between any number of mobile electronic devices within a relative geospatial boundary of a first mobile electronic device comprises the first step of keeping track of the physical position of the electronic devices using both low and, or high fidelity geospatial positioning techniques. Next, the first mobile electronic device determines if any other mobile electronic devices are within a geospatial boundary relative to the first mobile electronic device. Next, the first mobile electronic device determines if any of the other mobile electronic devices within its relative geospatial boundary are peers eligible for cryptographic authentication. After the first mobile electronic device authenticates another mobile electronic device, those devices may perform various data and, or dynamic policy operations.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION OF THE INVENTION

The following describes the details of the invention. Although the following description will proceed with reference being made to illustrative embodiments, many alternatives, modifications, and variations thereof will be apparent to those skilled in the art. Accordingly, it is intended that the claimed subject matter be viewed broadly. Examples are provided as reference and should not be construed as limiting. The term "such as" when used should be interpreted as "such as, but not limited to."

Figure 1:
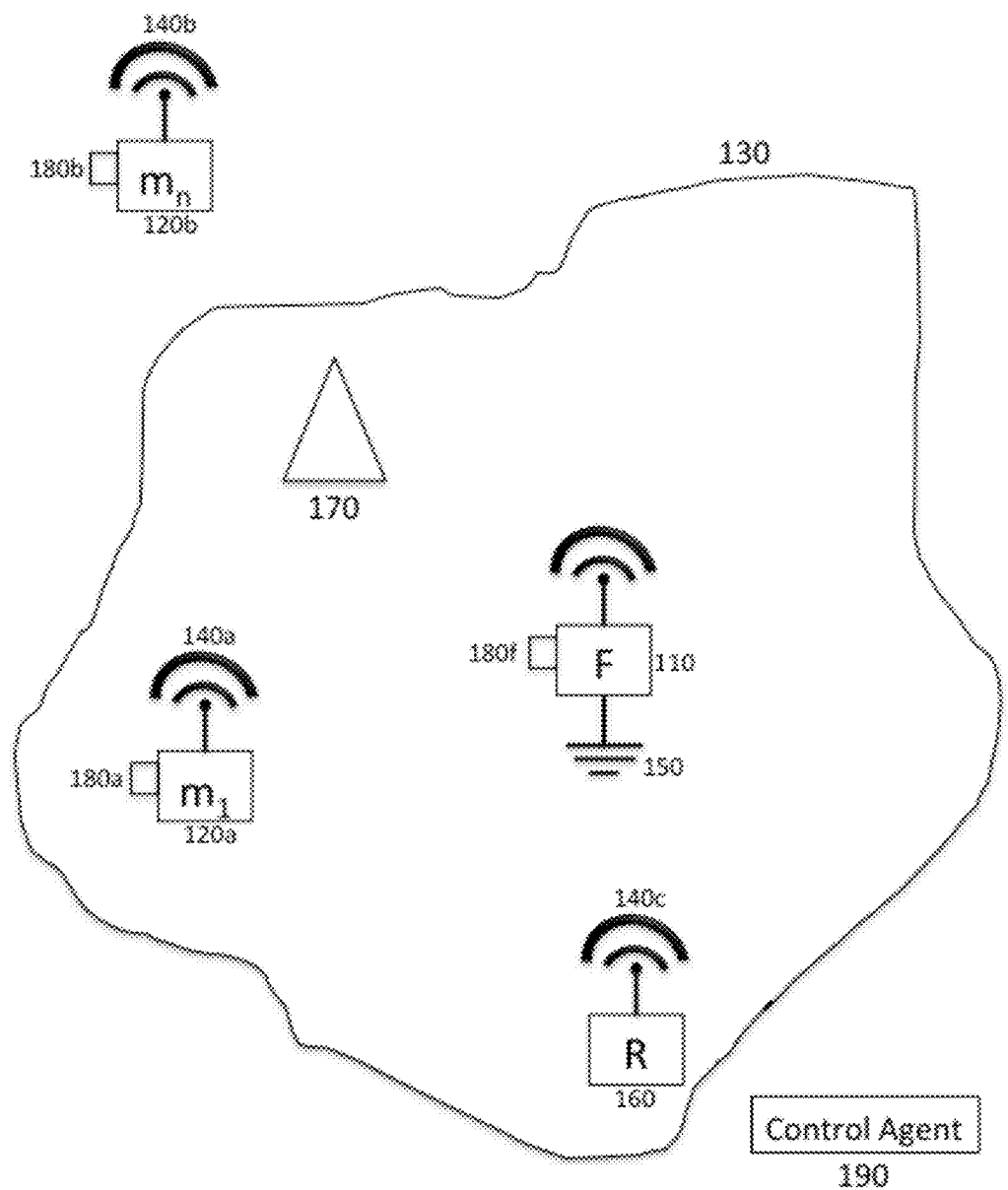
FIG. 1 is a diagram of an exemplary embodiment for cryptographically authenticating access between at least one fixed electronic device and any number of mobile electronic devices within a geospatial boundary in accordance with the teachings of the present invention.

FIG. 1 is a diagram of an exemplary embodiment for cryptographically authenticating access between at least one fixed electronic device 110 and any number of mobile electronic devices 120a and 120b within a geospatial boundary 130 in accordance with the teachings of the present invention. The physical positions of the mobile electronic devices 120a and 120b are tracked using low and, or high fidelity geospatial positioning techniques. The fixed electronic device 110 determines whether any mobile electronic devices 120a and 120b have entered a geospatial boundary 130 about the fixed electronic device 110. After detecting a mobile electronic device 120a within the geospatial boundary 130, the fixed electronic device 110 determines if the mobile electronic device 120a is a peer eligible for cryptographic authentication. After the fixed electronic device 110 authenticates the mobile electronic device 120a within the geospatial boundary 130, the fixed 110 and mobile 120a electronic devices perform various data and, or dynamic policy operations.

Prior to performing any data and, or dynamic policy operations the fixed electronic device 110 must establish cryptographic authentication with the mobile electronic device 120a. In other words, the fixed electronic device 110 must establish trust with the mobile electronic device 120a. The cryptographic authentication process begins when the mobile electronic device 120a sends an encrypted signal 140a to the fixed electronic device 110. The encrypted 140a may include information including the absolute or relative position of the mobile electronic device 110, as well as unique identification information. The identification information may include a serial code, certificate, or other means of identifying the mobile electronic device 120a as a peer authorized to perform data, or dynamic policy operations.

The fixed electronic device 110 may include any number of electronic devices such as a computer, video recorder, video or graphic display, communication, transmitter or receiver, radio or any type of electronic device with the ability to perform various data and, or dynamic policy operations. The fixed electronic device 110 is fixed to a specific geographic position 150 because it is not intended to be mobile, for example it may be fixed to a non-mobile power source, data transmission line, or otherwise not intended to be readily moved from its geographic position 150.

The fixed electronic device 110 tracks the physical position of the mobile electronic devices 120a and 120b using low and, or high fidelity geospatial positioning techniques. The mobile electronic devices 120a and 120b may transmit an encrypted signal containing 140a its absolute geospatial position. Such encrypted signals 140a and 140b may include the high fidelity position provided by the Global Positioning System ("GPS"), or any other geospatial positioning system capable of transmitting the absolute position of an electronic device with a similar high degree of accuracy. Alternatively, the fixed electronic device 110 may determine the geospatial position of the mobile electronic devices 120a and 120b using low fidelity techniques. Low fidelity techniques may include the use of Internet protocol ("IP") addresses to calculate the relative position of the mobile electronic devices 120a and 120b or signal triangulation, such as cell phone triangulation. In another example, the fixed electronic device 110 may determine when a mobile electronic device 120a is within the geospatial boundary 130 when the fixed 110 and mobile electronic device 120a are using a common resource 160, such as a Wi-Fi network, or a common beacon. The fixed electronic device 110 may determine that the mobile electronic device 120a is within the geospatial boundary 130 when the fixed 110 and mobile electronic device 120a mutually detect the common resource 160. The common resource 160 transmits an encrypted signal 140c in order to prevent malicious behavior such as spoofing. Another example where the fixed electronic device 110 can determine when a mobile electronic device 120a is within the geospatial boundary 130 is when the devices can each visually detect a common physical feature 170. In this example, the fixed 110 and mobile 120a and 120b electronic devices may be equipped with an optical recognition system 180a, 180b, and 180f, such as a camera and object recognition software, to detect the presence of a common physical feature 170, such as a building, person, mountain, or any other physically distinguishable feature. Other sensory detection systems may also be used to determine when the fixed 110 and mobile 120a electronic devices are within a geospatial boundary 130 such as olfactory, palate, audible, tactile, or spectral. Using the absolute and relative position techniques, including but not limited to the aforementioned examples, the fixed electronic device 110 can determine when mobile electronic devices 120a and 120b are within the geospatial boundary 130.

The mobile electronic devices 120a and 120b may include any type of electronic device such as a camera, phone, video camera, sensor, transmitter, receiver, radio, beacon, or any type of electronic device with the ability to perform various data and, or dynamic policy operations. The mobile electronic devices 120a and 120b differ from the fixed electronic device 110 in that it is capable of operating without the need for fixed power, data storage, or data transmitting capabilities. In other words, the mobile electronic device 120a is capable of performing various data and, or dynamic policy operations without being physically connected to anything with a fixed geospatial position. The mobile electronic device 120a may be of any size including sized to be carried by a person, or vehicle.

The geospatial boundary 130 may be formed from any polynomial shape including regular polynomials such as square, triangle, rectangle, circular, etc. The shape of the geospatial boundary 130 may also be formed from any irregular shape such as the random shape 130 shown in FIG. 1. The geospatial boundary 130 may also be based on a predetermined shape, but later changed to any other shape or size. The geospatial boundary 130 may be changed autonomously by the fixed electronic device 110 or non-autonomously by a control agent 190 at a remote location. The fixed electronic device 110 may autonomously change the geospatial boundary 130 based on various parameters such as date, duration, frequency, temperature, detection of malicious activity, etc.

Prior to performing data and, or dynamic policy operations, the fixed electronic device 110 must determine whether the mobile electronic device 120a is a trusted peer. This invention includes several peer determination methods.

Figure 2:
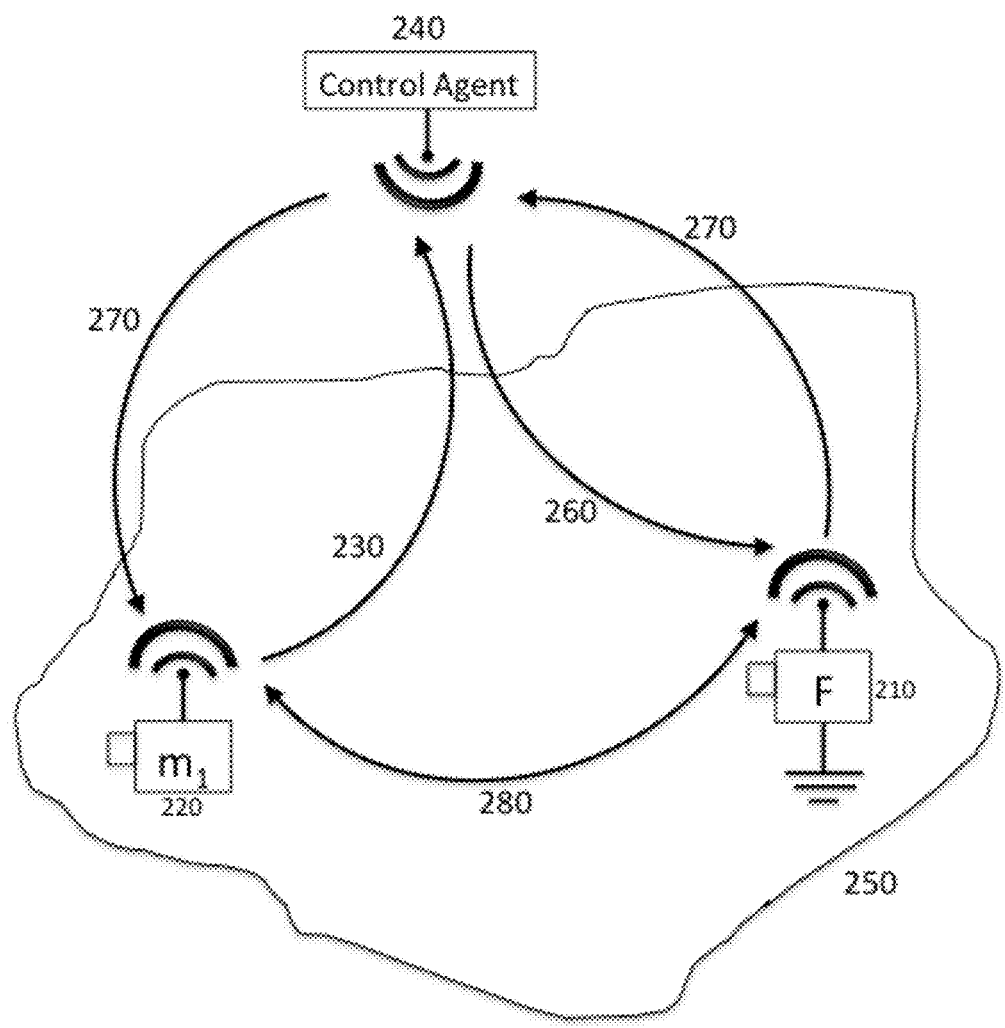
FIG. 2 is a diagram of an exemplary embodiment showing the self-determination method used by a fixed electronic device to determine mobile electronic device trusted peers in accordance with the teachings of the present invention.

The first peer determination approach is a self-determination method shown in FIG. 2. In this scenario, the fixed electronic device 210 determines whether the mobile electronic device 220 is an eligible peer without external intervention or logic control. A mobile electronic device 210 transmits a geospatial position update signal 230 to a control agent 240. The control agent 240 acts like a broker and transmits data to and from the fixed 210 and mobile 220 electronic devices. The use of a control agent 240 to broker data between the fixed 210 and mobile 220 electronic devices allows the devices to remain anonymous until trusted authentication is established. The control agent 240 performs position calculations to determine if the mobile electronic device 220 is within the fixed electronic device's 210 geospatial boundary 250. If the control agent 240 determines that a mobile electronic device 220 is within the geospatial boundary 250 of the fixed electronic device 210, the control agent 240 updates a contact list and electronically sends an encrypted signal 260 to the fixed electronic device 210. Alternatively, the control agent 240 may only send the changed portion of the list (i.e. the delta-list) to the fixed electronic device 210 to reduce the use of resources such as memory, power, wireless bandwidth, etc. The fixed electronic device 210 receives the updated key list and identifies whether the mobile electronic device 220 is a peer. The fixed electronic device 210 may use a predetermined contact list to determine if the nearby mobile electronic device 220 is a trusted peer, or determine that it is a trusted peer using other factors, such an IP address, certificate, serial number, model type, language, or other distinguishable characteristic. Upon declaring the mobile electronic device 220 as a trusted peer, the fixed electronic device 210 transmits an encrypted signal 270 to the control agent 240. The control agent 240 is not able to decrypt and read the encrypted message, but the control agent 240 is able to retransmit the encrypted signal 270 on to the mobile electronic device 220.

The encrypted signal 270 may contain the high fidelity geospatial position of the fixed electronic device 210 and unique identifying information such as serial number, certificate, or other distinguishing characteristic. Upon receiving the encrypted signal 270, the mobile electronic device 220 decrypts the signal and processes the data. The mobile electronic device 220 validates that it is within the fixed electronic device's 210 geospatial boundary 250 by comparing its position to the fixed electronic device's 210 high fidelity position transmitted in the encrypted signal 270. The mobile electronic device 220 then updates its contact list authenticating access to the fixed electronic device 210. With authenticated access established between the fixed 210 and mobile 220 electronic devices, the fixed 210 and mobile 220 electronic devices are able to transmit encrypted signals 280 directly to each other to perform data and, or dynamic policy operations securely since they have established that they are trusted peers.

Figure 3:
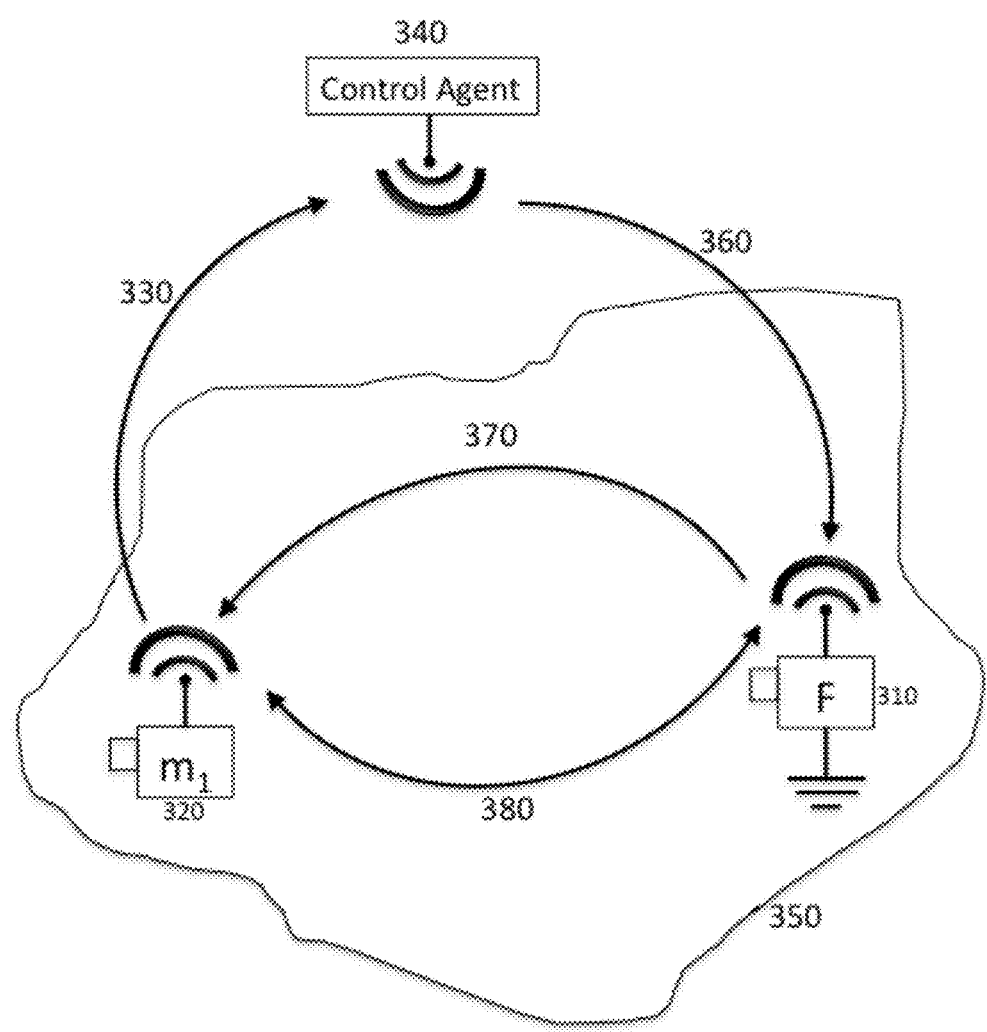
FIG. 3 is a diagram of an exemplary embodiment showing a control-agent method used by a fixed electronic device to determine mobile electronic device trusted peers in accordance with the teachings of the present invention.

The second peer determination approach shown in FIG. 3 uses a control agent 340 to manage authenticated access between the fixed 310 and mobile 320 electronic devices. In this scenario, the control agent 340 is a known trusted device, such as a remote trusted computing server. A mobile electronic device 320 transmits its geospatial position update signal 330 to the control agent 340. The use of a control agent 340 allows the devices to remain anonymous until trusted authentication is established. The control agent 340 performs position calculations to determine if the mobile electronic device 320 is within the fixed electronic device's 310 geospatial boundary 350. If the control agent 340 determines that a mobile electronic device 320 is within the geospatial boundary 350 of the fixed electronic device 310 and that the mobile electronic device 320 is a trusted peer, the control agent 340 updates a contact list and electronically sends it to the fixed electronic device 310. Alternatively, the control agent 340 may only send the changed portion of the list (i.e. the delta-list) to the fixed electronic device 310 to reduce the use of resources such as memory, power, wireless bandwidth, etc. The fixed electronic device 310 receives the updated key and knows it is a trusted peer because the control agent 340 has already determined that the mobile electronic device 320 is a trusted peer. The fixed electronic device 310 transmits an encrypted signal 370 directly to the mobile electronic device 320.

The encrypted signal 370 may contain the high fidelity geospatial position of the fixed electronic device 310 and unique identifying information such as serial number, certificate, or other distinguishing characteristic. Upon receiving the encrypted signal 370, the mobile electronic device 320 decrypts the signal and processes the data. The mobile electronic device 320 validates that it is within the fixed electronic device's 310 geospatial boundary 350 by comparing its position to the fixed electronic device's 310 high fidelity position transmitted in the encrypted signal 370. The mobile electronic device 320 then updates its contact list authenticating access to the fixed electronic device 310. With authenticated access established between the fixed 310 and mobile 320 electronic devices, the fixed 310 and mobile 320 electronic devices are able to transmit encrypted signals 380 directly to each other to perform data and, or dynamic policy operations securely since they have established that they are trusted peers.

Figure 4A:
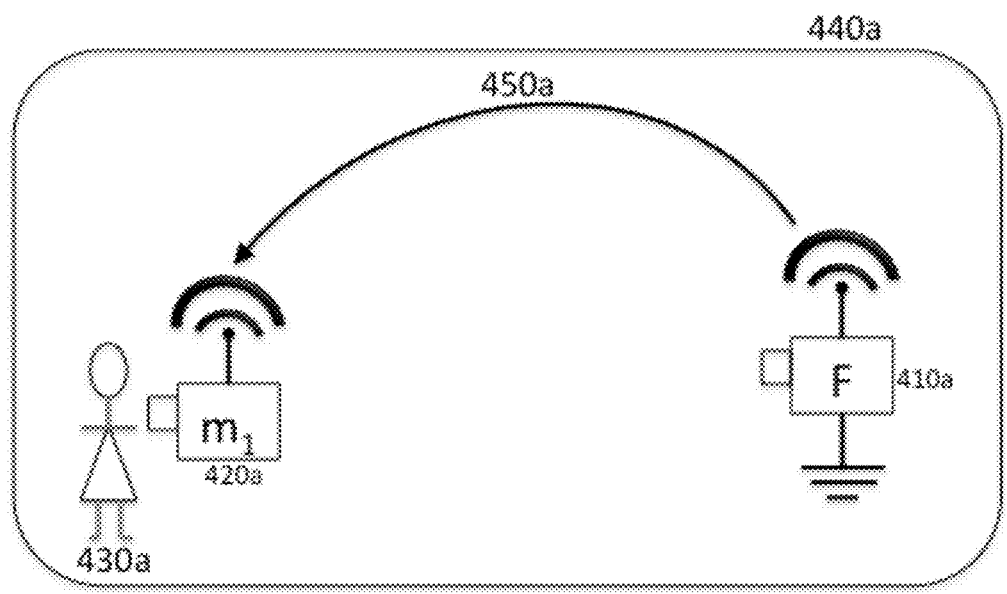
FIG. 4a, b includes illustrations of an exemplary embodiment showing a dynamic policy operation in accordance with the teachings of the present invention.
Figure 4B:
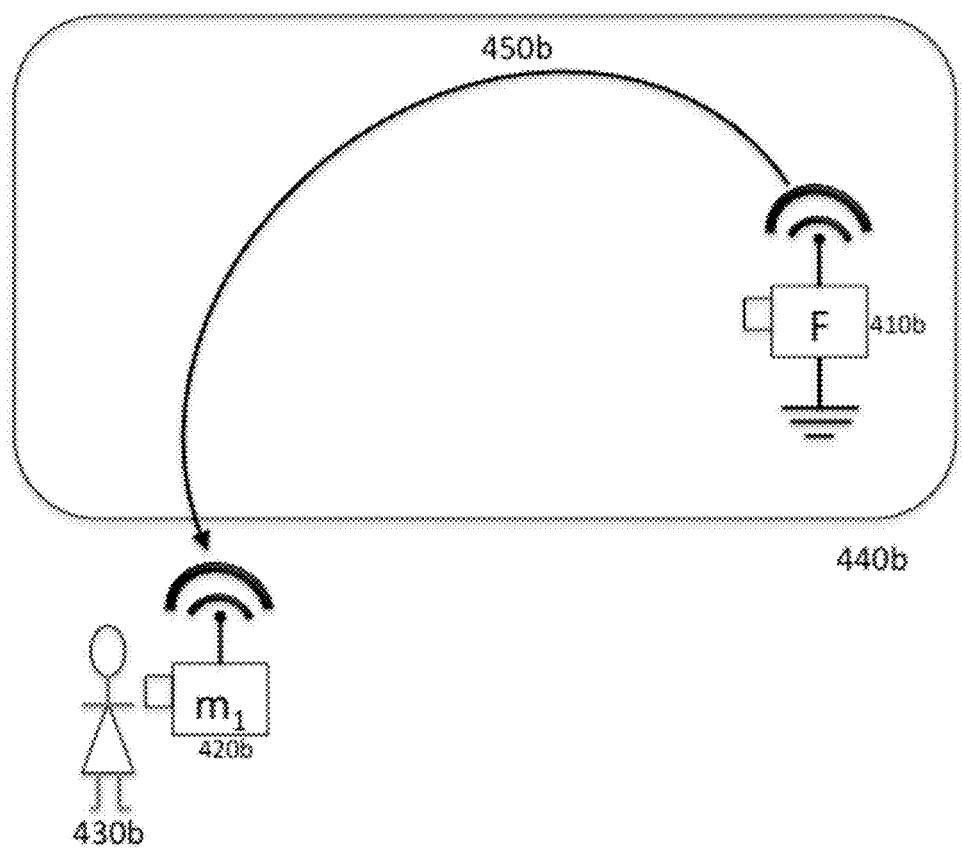

FIG. 4a and FIG. 4b illustrate an embodiment of the invention used to execute a dynamic policy operation. Once the fixed electronic device 410a has established geospatial trust with a mobile electronic device 420a, the devices may perform various data and, or dynamic policy operations. The various operations may include, but are not limited to electronically gathering, storing, processing, transferring, and purging data. The dynamic policy operations may include any operation that results in an expected outcome. For example, a user 430a of a mobile electronic device 420a may be authorized to use the mobile electronic device 420a within a geospatial boundary 440a; however access is revoked when the user leaves that geospatial boundary 440a. In this scenario, a fixed electronic device 410a will keep track of the geospatial position of the mobile electronic device 420a. The fixed electronic device 410a may transmit a warning signal 450 indicating that the user 420a is approaching the geospatial boundary 440a. Furthermore, the fixed electronic device 410a may transmit another signal 450b to encrypt the data on the mobile electronic device 440b and then power off the mobile electronic device 420b when the user exits the geospatial boundary 440b with the mobile electronic device 420b. The fixed electronic device 410b may continue to monitor the geospatial position of the mobile electronic device 420b using the geospatial positioning techniques described. The fixed electronic device 410b determines whether the mobile electronic device 420b has reentered the geospatial boundary 440b surrounding the fixed electronic device 410b. The fixed electronic device 410a then determines if the mobile electronic device 420a is still a peer eligible for cryptographic authentication. After the fixed electronic device 410a authenticates the mobile electronic device 420a within the geospatial boundary 440a, the devices may again perform various data and, or dynamic policy operations—such as powering on the mobile electronic device and decrypting its data.

Figure 5:
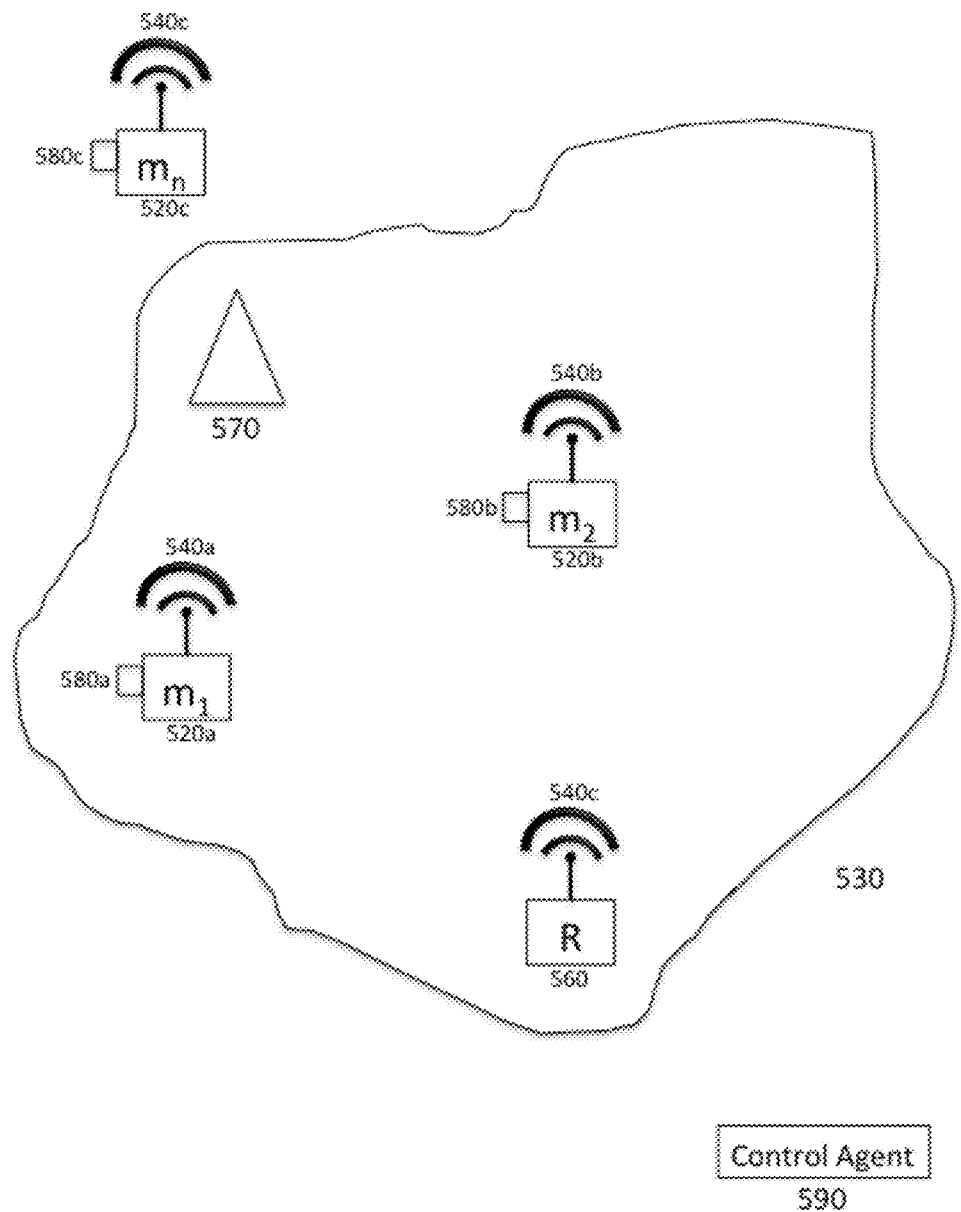
FIG. 5 is a diagram of an exemplary embodiment for cryptographically authenticating access between any number of mobile electronic devices within a geospatial boundary in accordance with the teachings of the present invention.

FIG. 5 is a diagram of an exemplary embodiment for cryptographically authenticating access between any number of mobile electronic devices 520a, 520b, and 520c within a geospatial boundary 530 in accordance with the teachings of the present invention. The physical positions of the mobile electronic devices 520a, 520b, and 520c are tracked using low and, or high fidelity geospatial positioning techniques. In this embodiment, one of the mobile electronic devices 520a determines when it is within a geospatial boundary 530. Alternatively, a remote control agent 590 may be used to determine when the mobile electronic device 520a has entered the geospatial boundary 530. The mobile electronic device 520a, or the remote control agent 590, then detects when another mobile electronic device 520b enters the geospatial boundary 530. After detecting another mobile electronic device 520b within the geospatial boundary 530, the first mobile electronic device 520a determines if the other mobile electronic devices 520b is a peer eligible for cryptographic authentication. After the first mobile electronic device 520a authenticates the other mobile electronic device 520b within the geospatial boundary 530, the devices perform various data and, or dynamic policy operations.

Prior to performing any data and, or dynamic policy operations the first mobile electronic device 520a must establish cryptographic authentication with the other mobile electronic device 520b. In other words, the first mobile electronic device 520a must establish trust with the other mobile electronic device 520b. The cryptographic authentication process begins when the mobile electronic device 520b sends an encrypted signal 540b to the first mobile electronic device 520a. The encrypted signal 540b may include information such as the absolute or relative position of the mobile electronic device 520b, as well as unique identification information. The identification information may include a serial code, certificate, or other means of identifying the mobile electronic device 520b as a peer authorized to perform data, or dynamic policy operations.

The first mobile electronic device 520a tracks the physical position of the other mobile electronic devices 520b and 520c using low and, or high fidelity geospatial positioning techniques. The mobile electronic devices 520b and 520c may transmit an encrypted signal 540b and 540c containing its absolute geospatial position. Such encrypted signals 540b and 540c may include the high fidelity position provided by the Global Positioning System ("GPS"), or any other geospatial positioning system capable of transmitting the absolute position of an electronic device with a similar high degree of accuracy. Alternatively, the first mobile electronic device 520a may determine the geospatial position of the other mobile electronic devices 520b and 520c using low fidelity techniques. Low fidelity techniques may include the use of Internet protocol ("IP") addresses to calculate the relative position of the mobile electronic devices 520b and 520c, or signal triangulation, such as cell phone triangulation. In another example, the first mobile electronic device 520a may determine that another mobile electronic device 520b is within the geospatial boundary 530 because the mobile electronic devices 520a and 520b are using the same resource 560, such as a Wi-Fi network, or a common beacon. The first mobile electronic device 520a may determine that another mobile electronic device 520b is within the geospatial boundary 530 when the mobile electronic devices 520a and 520b mutually detect the common resource 560. The common resource 560 is authenticated in order to prevent malicious behavior such as spoofing. Another example where the first mobile electronic device 520a can determine when another mobile electronic device 520b is within the geospatial spatial boundary 530 is when the devices can each visually detect a common physical feature 570. In this example, the mobile electronic devices 520a and 520b may be equipped with an optical recognition system 580a and 580b, such as a camera and object recognition software, to detect the presence of a common physical feature 570, such as a building, person, mountain, or any other physically distinguishable feature. Other sensory detection systems may also be used to determine when the mobile electronic devices 520a and 520b are within the geospatial boundary 530 such as olfactory, palate, audible, tactile, or spectral. Using the absolute and relative position techniques, including but not limited to the aforementioned examples, the first mobile electronic device 520a can determine when other mobile electronic devices 520b and 520c are within the geospatial boundary 530.

The mobile electronic devices 520a, 520b and 520c may include any type of electronic device such as a camera, phone, video camera, sensor, transmitter, receiver, radio, beacon, or any type of electronic device with the ability to perform various data and, or dynamic policy operations. The mobile electronic device 520a, 520b and 520c differs from the fixed electronic device 110 ref FIG. 1 in that it is capable of operating without the need for fixed power, data storage, or data transmitting capabilities. In other words, the mobile electronic device 520a is capable of performing various data and, or dynamic policy operations without being physically connected to anything with a fixed geospatial position. The mobile electronic device 520a may be of any size including sized to be carried by a person, or vehicle.

The geospatial boundary 530 may be formed from any polynomial shape including regular polynomials such as square, triangle, rectangle, circular, etc. The shape of the geospatial boundary 530 may also be formed from any irregular shape such as the random shape shown in FIG. 5. The geospatial boundary 530 may also be based on a predetermined shape, but later changed to any other shape or size. The geospatial boundary 530 may be changed autonomously by the mobile electronic device 520a or non-autonomously by a control agent 590 at a remote location. The mobile electronic device 520a may autonomously change the geospatial boundary 530 based on various parameters such as date, duration, frequency, temperature, detection of malicious activity, etc.

Prior to performing data and, or dynamic policy operations, the first mobile electronic device 520a must determine whether the other mobile electronic device 520b is a trusted peer. This invention includes several peer determination methods.

Figure 6:
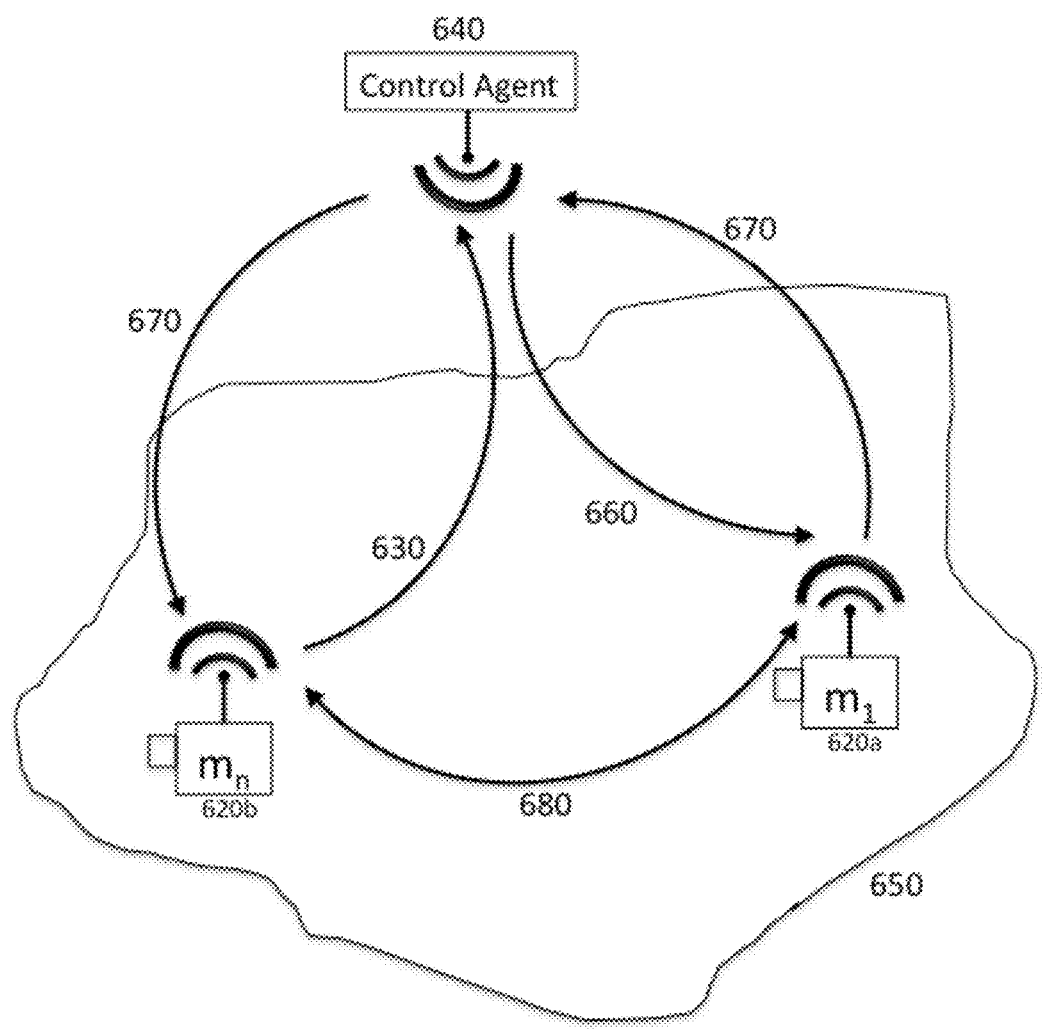
FIG. 6 is a diagram of an exemplary embodiment showing the self-determination method used by any number of mobile electronic devices within a geospatial boundary to determine mobile electronic device trusted peers in accordance with the teachings of the present invention.

The first peer determination approach is a self-determination method shown in FIG. 6. In this scenario, the first mobile electronic device 620a determines whether the other mobile electronic device 620b is an eligible peer without any external intervention or logical control. The other mobile electronic device 620b transmits a geospatial position update signals 630 to a control agent 640. The control agent 640 acts like a broker and transmits the encrypted signals between the mobile electronic devices 620a and 620b. The use of a control agent 640 to broker data between the mobile electronic devices 620a and 620b allows the devices to remain anonymous until trusted authentication is established. The control agent 640 performs position calculations to determine if the mobile electronic device 620b is within the geospatial boundary 650. If the control agent 640 determines that the mobile electronic device 620b is within the geospatial boundary 650, the control agent 640 updates a contact list and sends an encrypted message 660 to the first mobile electronic device 620a. Alternatively, the control agent 640 may only send the changed portion of the list (i.e. the delta-list) to the first mobile electronic device 620a to reduce the use of resources such as memory, power, wireless bandwidth, etc. The first mobile electronic device 620a receives the updated key list and identifies whether the other mobile electronic device 620b is a peer. The first mobile electronic device 620a may use a predetermined contact list to determine if the other mobile electronic device 620b is a trusted peer, or determine that it is a trusted peer using other factors, such an IP address, certificate, serial number, model type, language, or other distinguishable characteristic. Upon declaring the mobile electronic device 620b as a trusted peer, the first mobile electronic device 620a transmits an encrypted signal 670 to the control agent 640. The control agent 640 is not able to decrypt and read the encrypted message 670, but the control agent 640 is able to retransmit the signal on to the other mobile electronic device 620b.

The encrypted signal 670 may contain the high fidelity geospatial position of the first mobile electronic device 620a and unique identifying information such as serial number, certificate, or other distinguishing characteristic. Upon receiving the encrypted signal 670, the other mobile electronic device 620b decrypts the signal and processes the data. The mobile electronic device 620b validates that it is within the first mobile electronic device's 620a geospatial boundary 650 by comparing its position to the first mobile electronic device's 620a high fidelity position transmitted in the encrypted signal 670. The mobile electronic device 620b then updates its contact list authenticating access to the first mobile electronic device 620a. With authenticated access established between the first and other mobile electronic devices 620a and 620b, the first and other mobile electronic devices 620a and 620b are able to perform data and, or dynamic policy operations securely since they have established that they are trusted peers within the geospatial boundary 650.

Figure 7:
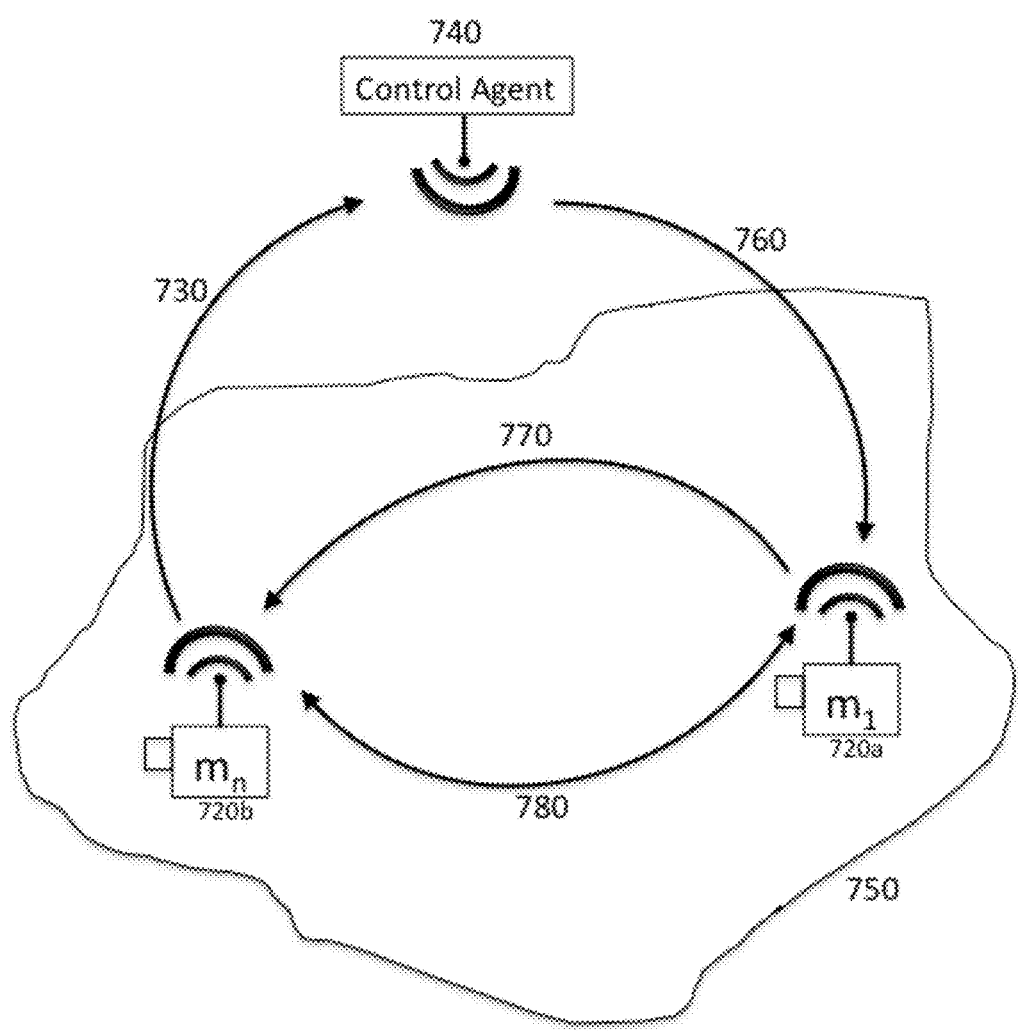
FIG. 7 is a diagram of an exemplary embodiment showing a control-agent method used by any number of mobile electronic devices within a geospatial boundary to determine mobile electronic device trusted peers in accordance with the teachings of the present invention.

The second peer determination approach shown in FIG. 7 uses a control agent 740 to manage authenticated access between the between the first and other mobile electronic devices 720a and 720b. In this scenario, the control agent 740 is a known trusted device, such as a remote trusted computing server. A mobile electronic device 720b transmits its geospatial position update in an encrypted signal 730 to the control agent 740. The use of a control agent 740 allows the devices to remain anonymous until trusted authentication is established. The control agent 740 performs position calculations to determine if the mobile electronic device 720b is within the first mobile electronic device's 720a geospatial boundary 750. If the control agent 740 determines that the other mobile electronic device 720b is within the geospatial boundary 750 of the first mobile electronic device 720a and that the other mobile electronic device 720b is a trusted peer, the control agent 740 updates a contact list and sends an encrypted signal 760 to the first mobile electronic device 720a. Alternatively, the control agent 740 may only send the changed portion of the list (i.e. the delta-list) to the first mobile electronic device 720a to reduce the use of resources such as memory, power, wireless bandwidth, etc. The first mobile electronic device 720a receives the updated key and knows it is a trusted peer because the control agent 740 has already determined that the mobile electronic device 720b is a trusted peer. The first mobile electronic device 720a transmits an encrypted signal 720a directly to the other mobile electronic device 720b.

The encrypted signal 770 may contain the high fidelity geospatial position of the first mobile electronic device 720a and unique identifying information such as serial number, certificate, or other distinguishing characteristic. Upon receiving the encrypted signal 770, the other mobile electronic device 720b decrypts the signal and processes the data. The mobile electronic device 720b validates that it is within the geospatial boundary 750 by comparing its position to the first mobile electronic device's 720a high fidelity position transmitted in the encrypted message 770. The mobile electronic device 720b then updates its contact list authenticating access to the first mobile electronic device 720a. With authenticated access established between mobile electronic devices 720a and 720b, they are able to perform data and, or dynamic policy operations securely since they have established that they are trusted peers within the geospatial boundary 750.

Figure 8A:
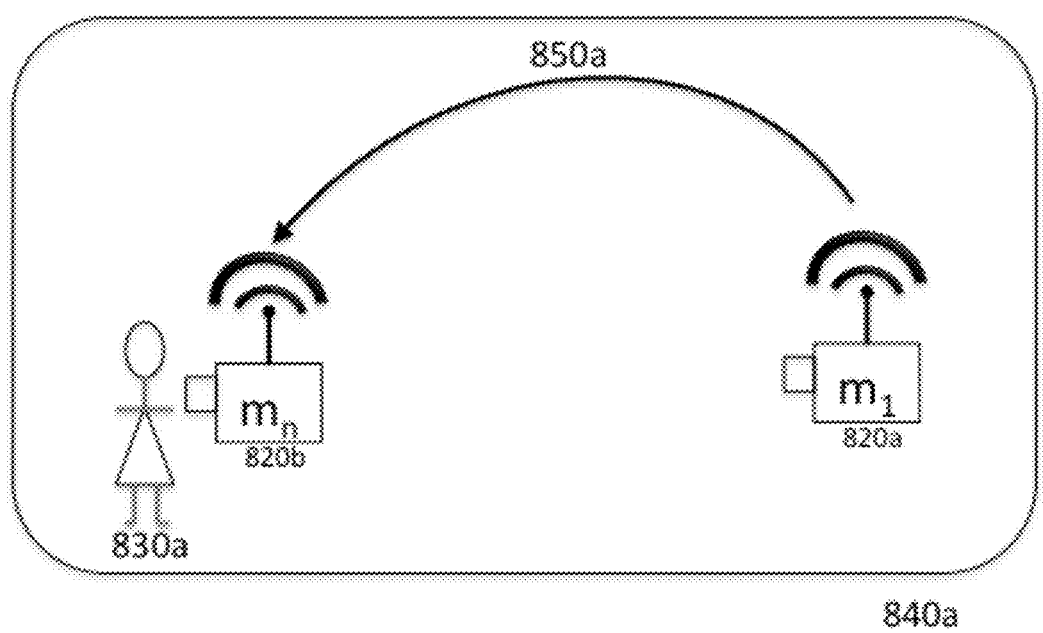
FIG. 8a, b includes illustrations of an exemplary embodiment showing a dynamic policy operation in accordance with the teachings of the present invention.
Figure 8B:
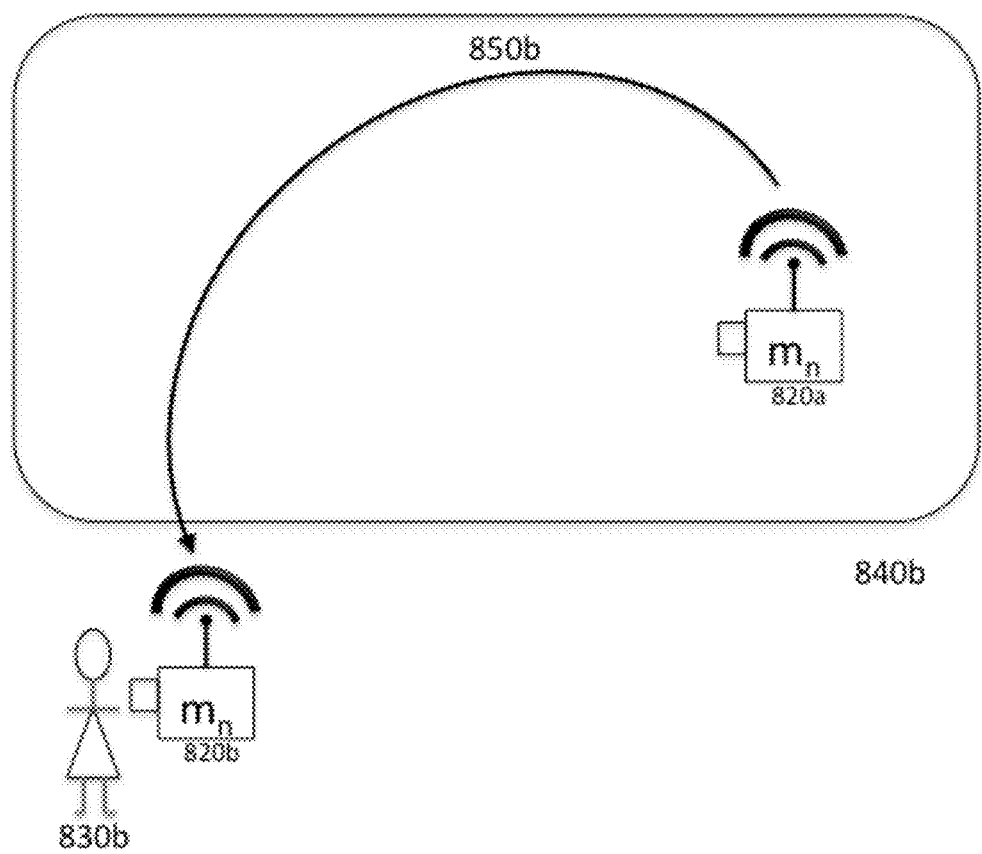

FIG. 8a and FIG. 8b illustrate an embodiment of the invention used to execute a dynamic policy operation. Once the first mobile electronic device 820a has established geospatial trust with another mobile electronic device 820b, the devices may perform various data and, or dynamic policy operations. The various operations may include, but are not limited to electronically gathering, storing, processing, transferring, and purging data. The dynamic policy operations may include any operation that results in an expected outcome. For example, a user 830a of a mobile electronic device 820b may be authorized to use the mobile electronic device 820b within a geospatial boundary 840a; however access is revoked when the user 830a leaves that geospatial boundary 840a. In this scenario, a first mobile electronic device 820a will keep track of the geospatial position of the other mobile electronic device 820b. The first mobile electronic device 820a may transmit a warning signal 850a indicating that the user 830a is approaching the geospatial boundary 840a.

Referring to FIG. 8b, the first mobile electronic device 820a may transmit another signal 850b to encrypt the data on the other mobile electronic device 820b and then power off the other mobile electronic device 820b when the user 830b exits the geospatial boundary 840b with the other mobile electronic device 820b. The first mobile electronic device 820a may continue to monitor the geospatial position of the other mobile electronic device 820b using the geospatial positioning techniques described. The first mobile electronic device 820a detects when the other mobile electronic device 820b has reentered the geospatial boundary. The first mobile electronic device 820a then determines if the other mobile electronic device 820b is still a peer eligible for cryptographic authentication. After the first mobile electronic device 820*a* authenticates the other mobile electronic device 820*b* within the geospatial boundary 840*a*, the devices may again perform various data and, or dynamic policy operations—such as powering on the other mobile electronic device 820*b* and decrypting its data.

Figure 9:
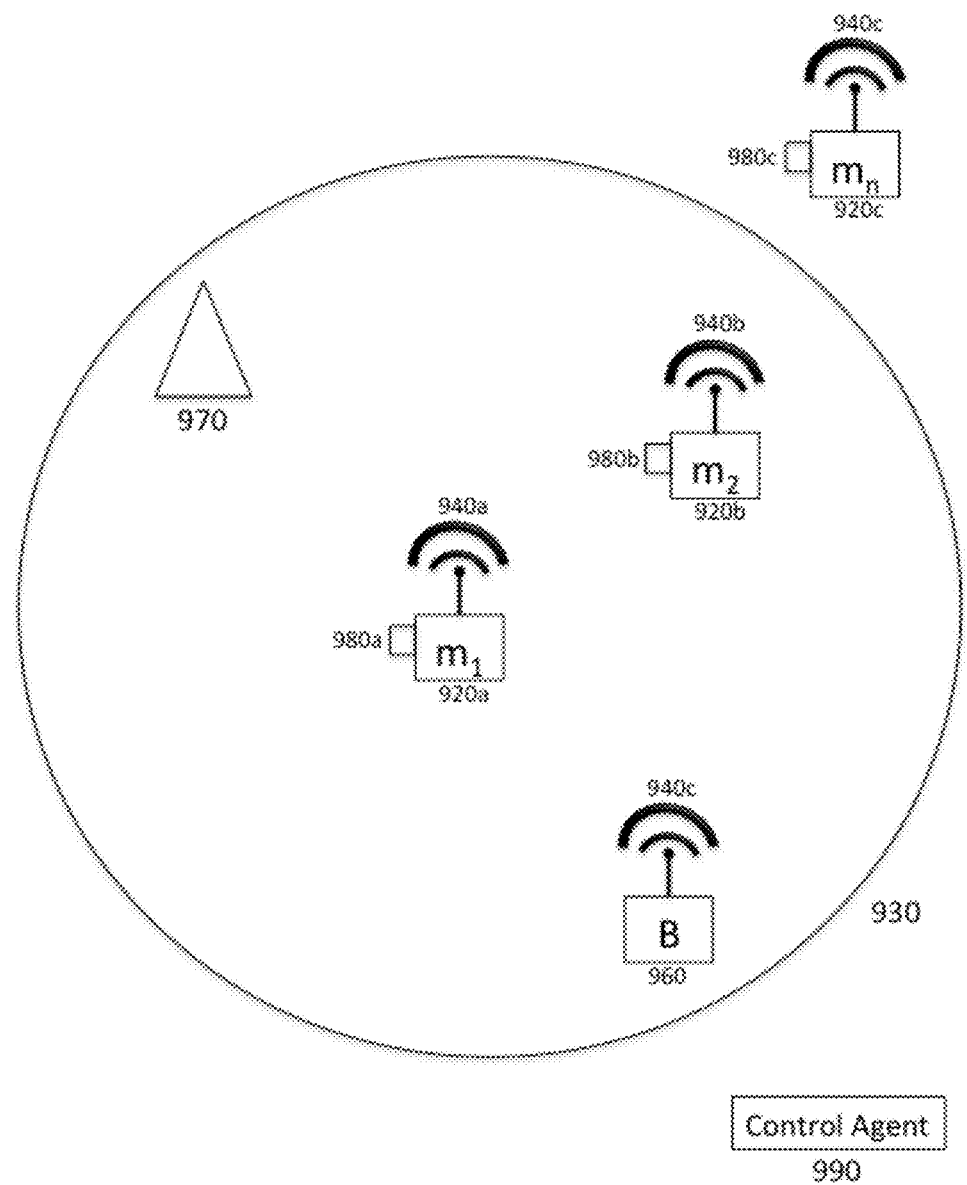
FIG. 9 is a diagram of an exemplary embodiment for cryptographically authenticating access between any number of mobile electronic devices within a relative geospatial boundary of a first mobile electronic device in accordance with the teachings of the present invention.

FIG. 9 is a diagram of an exemplary embodiment for cryptographically authenticating access between any number of mobile electronic devices 920*a*, 920*b*, and 920*c* within a geospatial boundary 930 relative to one of the mobile electronic devices 920*a* in accordance with the teachings of the present invention. The physical positions of the mobile electronic devices 920*a*, 920*b*, and 920*c* are tracked using low and, or high fidelity geospatial positioning techniques. In this embodiment, the first mobile electronic device 920*a* determines when another mobile electronic device 920*b* enters the geospatial boundary 930 relative to the first mobile electronic device 920*a*. In other words, the geospatial boundary 930 moves relative with the first mobile electronic device 920*a*. Alternatively, a remote control agent 990 may be used to determine when the other mobile electronic device 920*b* has entered the relative geospatial boundary 930. The first mobile electronic device 920*a*, or the remote control agent 990, then detects when another mobile electronic device 920*b* enters the relative geospatial boundary 930. After detecting another mobile electronic device 920*b* within the relative geospatial boundary 930, the first mobile electronic device 920*a* determines if the other mobile electronic device 920*b* is a peer eligible for cryptographic authentication. After the first mobile electronic device 920*a* authenticates the other mobile electronic device 920*b* within the relative geospatial boundary 930, the devices may perform various data and, or dynamic policy operations.

Prior to performing any data and, or dynamic policy operations the first mobile electronic device 920*a* must establish cryptographic authentication with the other mobile electronic device 920*b*. In other words, the first mobile electronic device 920*a* must establish trust with the other mobile electronic device 920*b*. The cryptographic authentication process begins when the mobile electronic device 920*b* sends an encrypted message 940*a* to the first mobile electronic device 920*a*. The encrypted message 940*a* may include information including the absolute or relative position of the mobile electronic device 920*a*, as well as unique identification information. The identification information may include a serial code, certificate, or other means of identifying the mobile electronic device 920*a* as a peer authorized to perform data, or dynamic policy operations.

The first mobile electronic device 920*a* tracks the physical position of the other mobile electronic devices 920*b* and 920*c* using low and, or high fidelity geospatial positioning techniques. The mobile electronic devices 920*b* and 920*c* may transmit an encrypted electronic signal 940*b* and 920*c* containing its absolute geospatial position. Such encrypted signals 940*b* and 920*c* may include the high fidelity position provided by the Global Positioning System ("GPS"), or any other geospatial positioning system capable of transmitting the absolute position of an electronic device with a similar high degree of accuracy. Alternatively, the first mobile electronic device 920*a* may determine the geospatial position of the other mobile electronic devices 920*b* and 920*c* using low fidelity techniques. Low fidelity techniques may include the use of Internet protocol ("IP") addresses to calculate the relative position of the mobile electronic devices 920*b* and 920*c*, or signal triangulation, such as cell phone triangulation. In another example, the first mobile electronic device 920*a* may determine when another mobile electronic device 920*b* is within the relative geospatial boundary 930 when the mobile electronic devices 920*a* and 920*b* are using a common resource 960, such as a Wi-Fi network, or a common beacon. The first mobile electronic device 920*a* may determine that another mobile electronic device 920*b* is within the relative geospatial boundary 930 when the mobile electronic devices 920*a* and 920*b* mutually detect the common resource 960. The common resource 960 is authenticated in order to prevent malicious behavior such as spoofing. Another example where the first mobile electronic device 920*a* can determine when another mobile electronic device 920*b* is within the relative geospatial boundary 930 is when the devices can each visually detect a common physical feature 970. In this example, the electronic devices 920*a* and 920*b* may be equipped with an optical recognition system 980*a* and 980*b*, such as a camera and object recognition software, to detect the presence of a common physical feature 970, such as a building, person, mountain, or any other physically distinguishable feature. Other sensory detection systems may also be used to determine when the mobile electronic devices 980*a* and 980*b* are within a relative geospatial boundary 930 such as olfactory, audible, tactile, or spectral. Using the absolute and relative position techniques, including but not limited to the aforementioned examples, the first mobile electronic device 980*a* can determine when another mobile electronic device 980*b* is within the relative geospatial boundary 930.

The mobile electronic devices 980*a*, 980*b*, and 980*c* may include any type of electronic device such as a camera, phone, video camera, sensor, transmitter, receiver, radio, beacon, or any type of electronic device with the ability to perform various data and, or dynamic policy operations. The mobile electronic device 980*a*, 980*b*, and 980*c* differs from the fixed electronic device 110 ref FIG. 1 in that it is capable of operating without the need for fixed power, data storage, or data transmitting capabilities. In other words, the mobile electronic device 980*a* is capable of performing various data and, or dynamic policy operations without being physically connected to anything with a fixed geospatial position. The mobile electronic device 980*a* may be of any size including sized to be carried by a person, or vehicle.

The relative geospatial boundary 930 may be formed from any polynomial shape including regular polynomials such as square, triangle, rectangle, circular, etc. The shape of the relative geospatial boundary 930 may also be formed from any irregular shape. The relative geospatial boundary 930 may also be based on a predetermined shape, but later changed to any other shape or size. The relative geospatial boundary 930 may be changed autonomously by the mobile electronic device 920*a* or non-autonomously by a remote control agent 990. The mobile electronic device 920*a* may autonomously change the relative geospatial boundary 930 based on various parameters such as date, duration, frequency, temperature, detection of malicious activity, etc.

Prior to performing data and, or dynamic policy operations, the first mobile electronic device 920*a* must determine whether the other mobile electronic device 920*b* is a trusted peer. This invention includes several peer determination methods.

Figure 10:
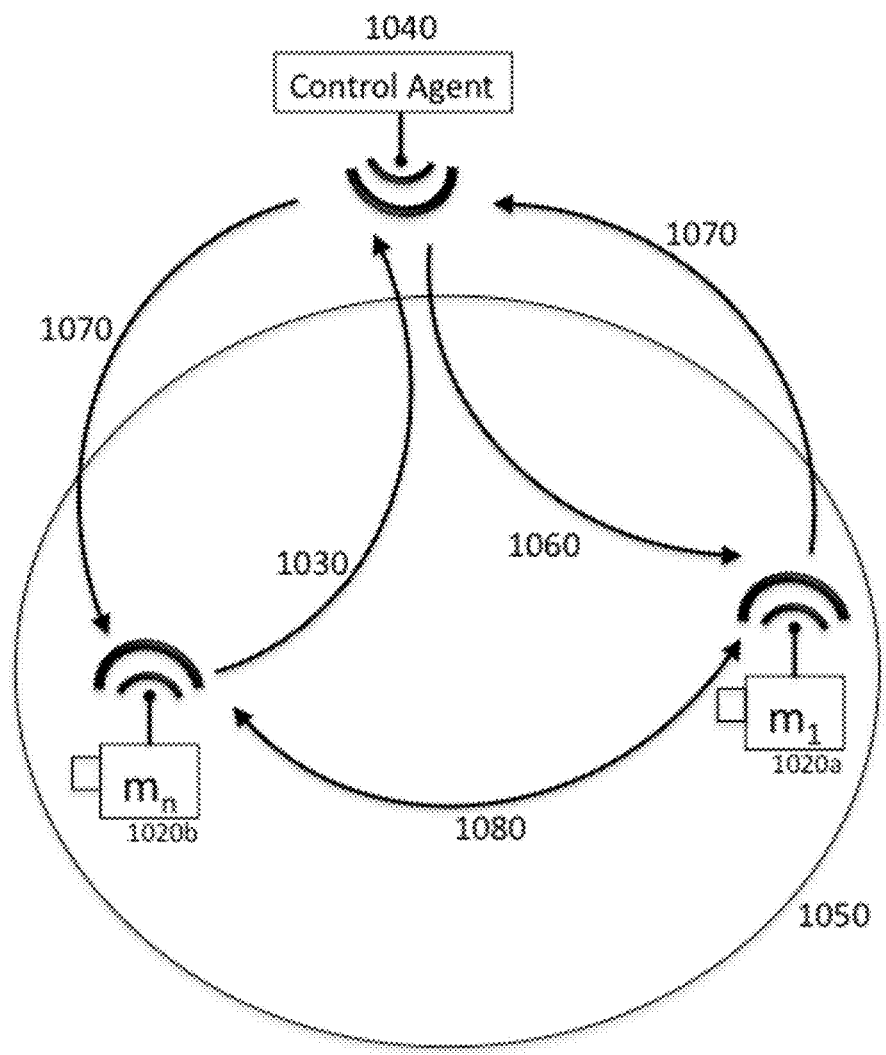
FIG. 10 is a diagram of an exemplary embodiment showing the self-determination method used by any number of mobile electronic devices within a relative geospatial boundary of a first mobile electronic device to determine mobile electronic device trusted peers in accordance with the teachings of the present invention.

The first peer determination approach is a self-determination method shown in FIG. 10. In this scenario, the first mobile electronic device 1020*a* determines whether the other mobile electronic device 1020*b* is an eligible peer without any external intervention or logical control. The mobile electronic device 1020*b* transmits an encrypted signal 1030 with its relative geospatial position to a control agent 1040. The control agent 1040 acts like a broker and transmits data between the mobile electronic devices 1020*a* and 1020*b*. The use of a control agent 1040 to broker data between the mobile electronic devices 1020a and 1020b allows the devices 1020a and 1020b to remain anonymous until trusted authentication is established. The control agent 1040 performs position calculations to determine if the other mobile electronic device 1020b is within the relative geospatial boundary 1050 of the first mobile electronic device 1020a. If the control agent 1040 determines that the mobile electronic devices 1020a and 1020b are within the relative geospatial boundary 1050 the control agent 1040 updates a contact list and electronically sends it to the first mobile electronic device 1020a. Alternatively, the control agent 1040 may only send the changed portion of the list (i.e. the delta-list) to the first mobile electronic device 1020a to reduce the use of resources such as memory, power, wireless bandwidth, etc. The first mobile electronic device 1020a receives the updated key list and identifies whether the other mobile electronic device 1020b is a peer. The first mobile electronic device 1020a may use a predetermined contact list to determine if the other mobile electronic device 1020b is a trusted peer, or determine that it is a trusted peer using other factors, such an IP address, certificate, serial number, model type, language, or other distinguishable characteristic. Upon declaring the mobile electronic device 1020b as a trusted peer, the first mobile electronic device 1020a transmits an encrypted signal 1070 to the control agent 1040. The control agent 1040 is not able to decrypt and read the encrypted message, but the control agent 1040 is able to send the signal 1070 on to the other mobile electronic device 1020b.

The encrypted signal 1070 may contain the high fidelity relative geospatial position of the first mobile electronic device 1020a and unique identifying information such as serial number, certificate, or other distinguishing characteristic. Upon receiving the encrypted signal 1070, the other mobile electronic device 1020b decrypts the signal and processes the data. The mobile electronic device 1020b validates that it is within the first mobile electronic device's 1020a relative geospatial boundary 1050 by comparing its position to the first mobile electronic device's 1020a high fidelity position transmitted in the encrypted message 1070. The mobile electronic 1020b device then updates its contact list authenticating access to the first mobile electronic device 1020a. With authenticated access established between the first and other mobile electronic devices 1020a and 1020b, the first and other mobile electronic devices 1020a and 1020b are able to perform data and, or dynamic policy operations securely since they have established that they are trusted peers within the relative geospatial boundary 1050.

Figure 11:
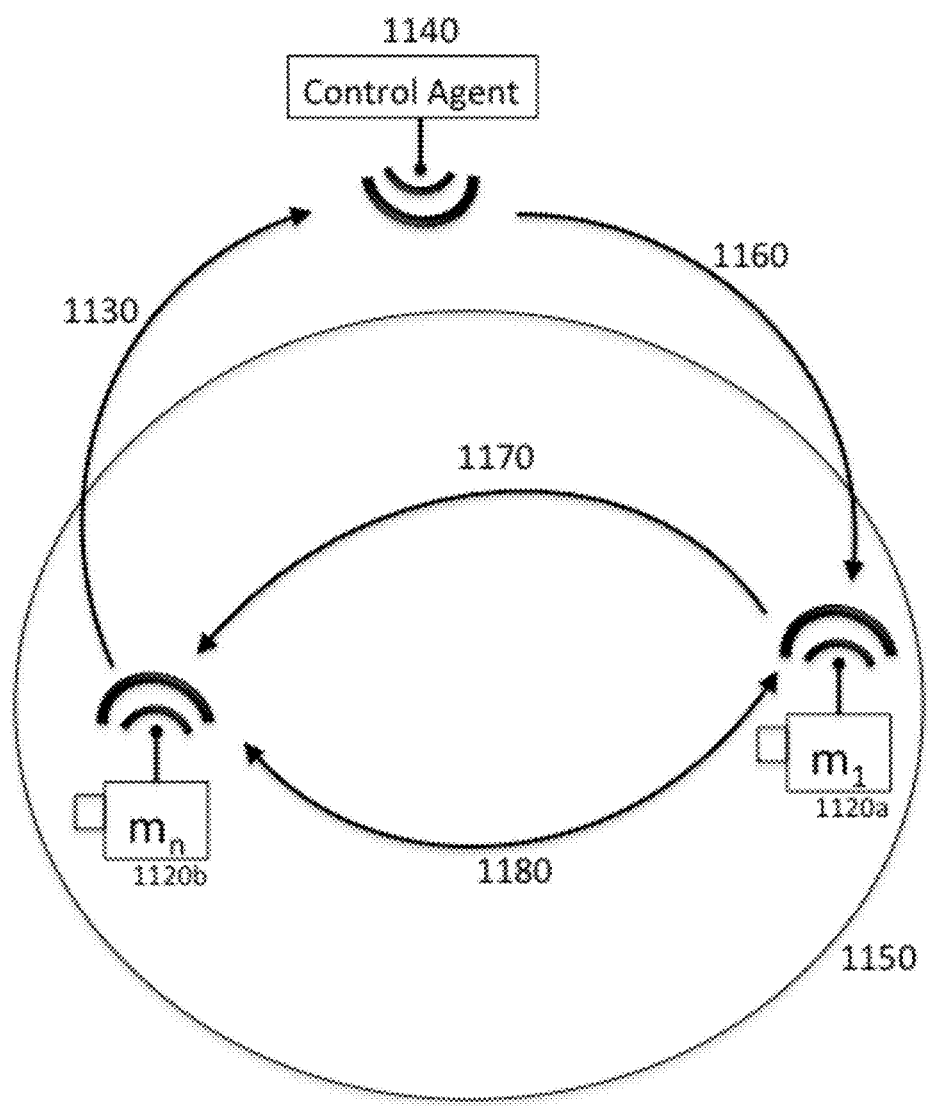
FIG. 11 is a diagram of an exemplary embodiment showing a control-agent method used by any number of mobile electronic devices within a relative geospatial boundary of a first mobile electronic device to determine mobile electronic device trusted peers in accordance with the teachings of the present invention; &

The second peer determination approach shown in FIG. 11 uses a control agent 1140 to manage authenticated access between the between the first and other mobile electronic devices 1120a and 1120b. In this scenario, the control agent 1140 is a known trusted device, such as a remote trusted computing server. A mobile electronic device 1120b transmits its relative geospatial position update signal 1130 to the control agent 1140. The use of a control agent 1140 allows the devices 1120a and 1120b to remain anonymous until trusted authentication is established. The control agent 1140 performs position calculations to determine if the mobile electronic device 1120b is within the first mobile electronic device's 1120a relative geospatial boundary 1150. If the control agent 1140 determines that the mobile electronic device 1120b is within the relative geospatial boundary 1150 of the first mobile electronic device 1120a and that the mobile electronic device 1120b is a trusted peer, the control agent 1140 updates a contact list and sends an encrypted signal 1160 to the first mobile electronic device 1120a. Alternatively, the control agent 1140 may only send the changed portion of the list (i.e. the delta-list) to the first mobile electronic device 1120a to reduce the use of resources such as memory, power, wireless bandwidth, etc. The first mobile electronic device 1120a receives the updated key and knows the other mobile electronic device 1120b is a trusted peer because the control agent 1140 has already determined that the mobile electronic device 1120b is a trusted peer. The first mobile electronic device 1120a transmits an encrypted signal 1170 directly to the other mobile electronic device 1120b.

The encrypted signal 1170 may contain the high fidelity relative geospatial position of the first mobile electronic device 1120a and unique identifying information such as serial number, certificate, or other distinguishing characteristic. Upon receiving the encrypted signal 1170, the other mobile electronic device 1120b decrypts the encrypted signal 1170 and processes the data. The mobile electronic device 1120b validates that it is within the relative geospatial boundary 1150 by comparing its position to the first mobile electronic device's 1120a high fidelity position transmitted in the encrypted message 1170. The mobile electronic device 1120b then updates its contact list authenticating access to the first mobile electronic device 1120a. With authenticated access established between mobile electronic devices, the first and other mobile electronic devices 1120a and 1120b are able to transmit encrypted signals 1180 to each other to perform data and, or dynamic policy operations securely since they have established that they are trusted peers within the relative geospatial boundary 1150.

Figure 12A:
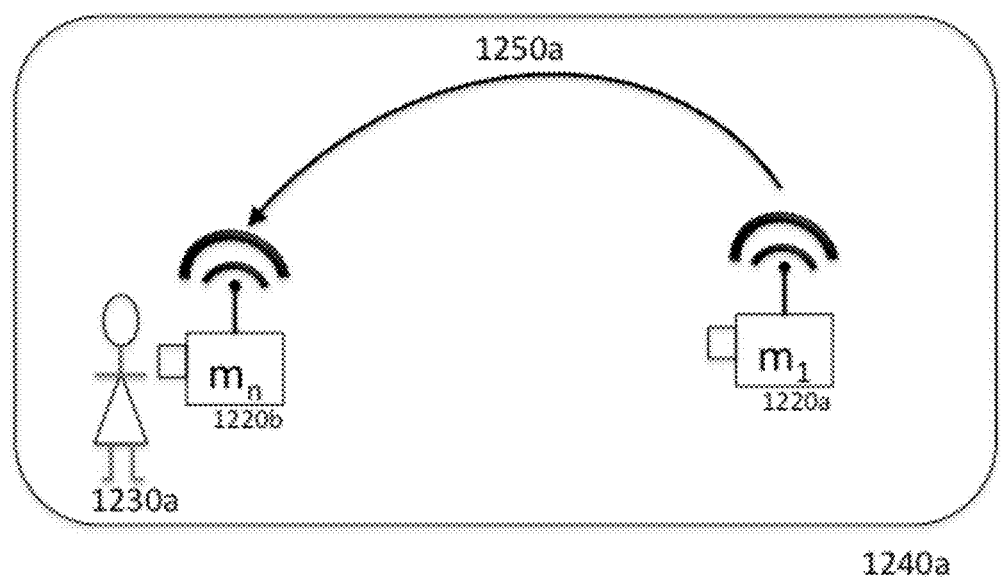
FIG. 12 a & b includes illustrations of an exemplary embodiment showing a dynamic policy operation in accordance with the teachings of the present invention.
Figure 12B:
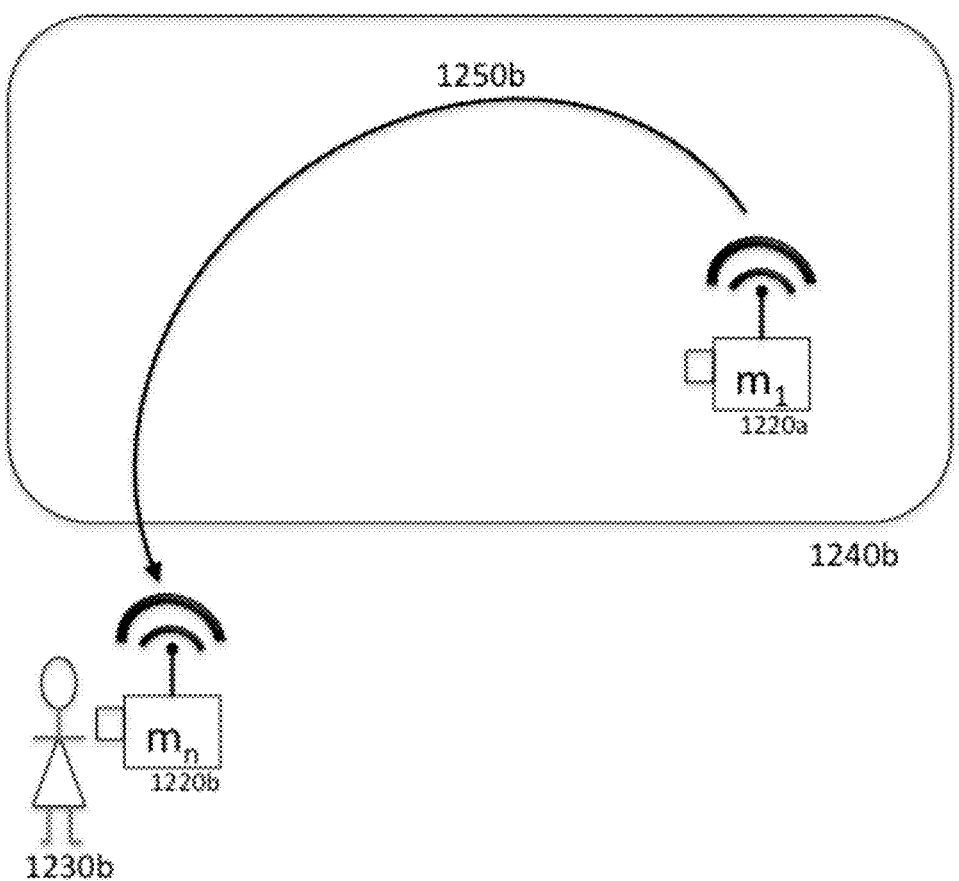

FIG. 12a and FIG. 12b illustrate an embodiment of the invention used to execute a dynamic policy operation. Once the first mobile electronic device 1220a has established geospatial trust with another mobile electronic device 1220b, the devices may perform various data and, or dynamic policy operations. The various operations may include, but are not limited to electronically gathering, storing, processing, transferring, and purging data. The dynamic policy operations may include any operation that results in an expected outcome. For example, a user 1230a of a mobile electronic device 1220b may be authorized to use the mobile electronic device 1220b within a relative geospatial boundary 1240a however access is revoked when the user 1230a leaves the relative geospatial boundary 1240a. In this scenario, a first mobile electronic device 1220a will keep track of the geospatial position of the other mobile electronic device 1220b. The first mobile electronic device 1220a may transmit a warning signal 1250a indicating that the user 1230a is about to leave the relative geospatial boundary 1240a. Furthermore, the first mobile electronic device 1220a may transmit another signal 1250b to encrypt the data on the other mobile electronic device 1220b and then power off the other mobile electronic device 1220b when the user 1230b exits the relative geospatial boundary 1240b with the other mobile electronic device 1220b. The first mobile electronic device 1220a may continue to monitor the geospatial position of the other mobile electronic device 1220b using the geospatial positioning techniques described. The first mobile electronic device 1220a detects when the other mobile electronic device 1220b has reentered the relative geospatial boundary 1240a. The first mobile electronic device 1220a then determines if the other mobile electronic device 1220b is still a peer eligible for cryptographic authentication. After the first mobile electronic device 1220a authenticates the other mobile electronic device 1220b within the relative geospatial boundary 1240a, the devices may again perform various data and, or dynamic policy operations—such as powering on the other mobile electronic device 1220b and decrypting its data.

Figure 13:
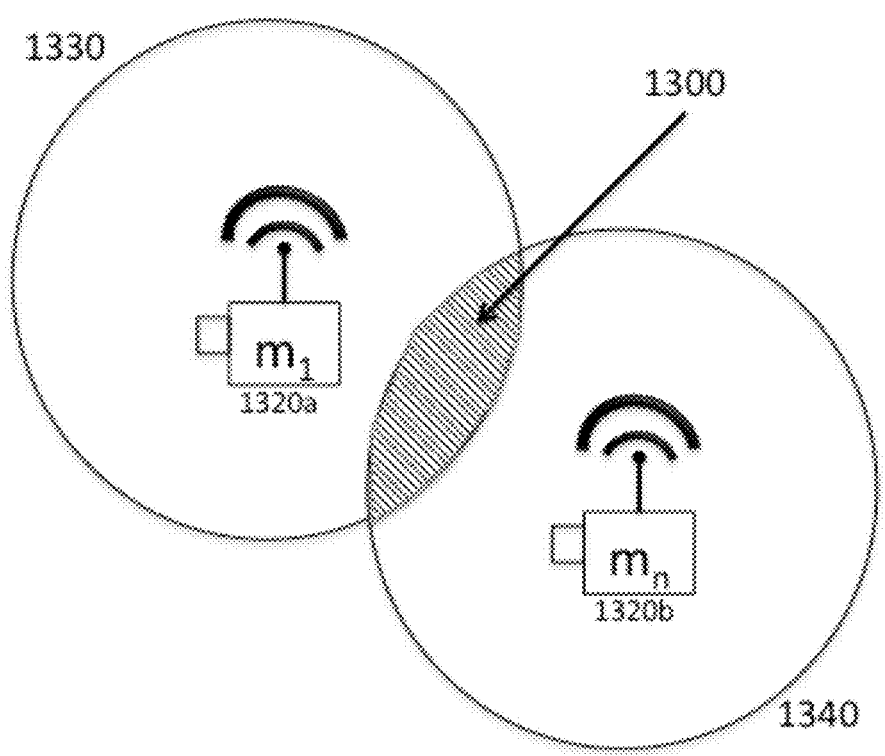
FIG. 13 is a diagram of an exemplary embodiment for cryptographically authenticating access between any number of mobile electronic devices when the RF signal of a second mobile electronic device is within the relative geospatial boundary of the first mobile electronic device in accordance with the teachings of the present invention.

FIG. 13 is a diagram of an exemplary embodiment for cryptographically authenticating access between any number of mobile electronic devices 1320*a* and 1320*b* similar to the embodiment shown in FIG. 9. However in this example, the second mobile electronic device 1320*b* is not physically within the geospatial boundary 1330 of the first mobile electronic device 1320*a*. In this scenario, the second mobile electronic device's 1320*b* RF signal 1340 broadcasts into the geospatial boundary 1330 of the first mobile electronic device 1320*a*. The first mobile electronic device 1320*a* detects when the RF signal 1340 intersects 1300 its geospatial boundary 1330 and then implements the cryptographic authentication, peer determination methods, and data and, or dynamic policy operations previously described.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method for authenticating access between a fixed device surrounded by a geospatial boundary and a mobile device that enters the geospatial boundary for secure communication comprising:
    keeping track of the physical position of the mobile device using a geospatial positioning technique;
    enabling the fixed device to determine when the mobile device has entered the geospatial boundary surrounding the fixed device;
    wherein the fixed device determines if the mobile device is a peer eligible for authentication;
    upon authenticating the mobile device, the fixed device and the mobile device perform an operation while the fixed device and the mobile device are within the geospatial boundary;
    wherein the geospatial boundary is defined by a geometric shape and a size; and
    wherein the method that the fixed device determines if the mobile device is a peer eligible for authentication comprises,
    the mobile device sending an encrypted signal that includes a geospatial position of the mobile device to a control agent;
    wherein the control agent acts as a broker and transmits the geospatial position from the mobile device to the fixed device, thus enabling the fixed device and the mobile device to remain anonymous until a trusted authentication is established between the fixed device and the mobile device;
    the control agent performing a position calculation to determine if the mobile device is within the geospatial boundary;
    upon the control agent determining that the mobile device is within the geospatial boundary, the control agent sending an updated contact list including an identifying information of the mobile device to the fixed device;
    the fixed device receiving the updated contact list and using the updated contact list to determine that the mobile device is a peer;
    upon determining that the mobile device is a peer the fixed device transmitting an encrypted signal to the control agent, wherein the encrypted signal includes a high fidelity position and a unique identification information of the fixed device;
    wherein the control agent is not able to decrypt or read the encrypted signal and is only enabled to send the encrypted signal to the mobile device;
    upon receiving the encrypted signal, the mobile device decrypting the encrypted signal enabling the mobile device to access the high fidelity position and the unique identification information of the fixed device;
    the mobile device using the high fidelity position of the fixed device to determine that the mobile device is still within the geospatial boundary; and
    the mobile device updating a contact list to finalize authenticated access with the fixed device enabling the mobile device and fixed device to transmit encrypted signals directly to each other.

2. The method of claim 1, wherein the geospatial positioning technique includes a high fidelity positioning technique including a geospatial positioning system capable of transmitting an absolute position of a device.

3. The method of claim 1, wherein the geospatial position technique includes a low fidelity technique including the use of an Internet protocol ("IP") address used to calculate a relative position of the mobile device or signal triangulation with a cell phone triangulation.

4. The method of claim 1, wherein the fixed device determines that the mobile device is within the geospatial boundary when the fixed device and the mobile device are using a common resource.

5. The method of claim 1, wherein the fixed device determines that the mobile device is within the geospatial boundary when the fixed device and the mobile device each detect a same physical feature, wherein the same physical feature is also located within the geospatial boundary.

6. The method of claim 1, wherein a shape or a size of the geospatial boundary is changed based on a parameter including a date, duration, frequency, temperature, or detection of malicious activity.

7. The method of claim 1, wherein the operation comprises electronically gathering, storing, processing, transferring, or purging data.

8. A method for authenticating access between a first mobile device and a second mobile device that both enter a geospatial boundary for secure communications comprising:
    keeping track of the physical position of the first mobile device and the second mobile device using a geospatial positioning technique;
    enabling the first mobile device to determine whether it is within the geospatial boundary;
    enabling the second mobile device to determine whether it is within the geospatial boundary;
    enabling the first mobile device to determine if the second mobile device is a peer eligible for cryptographic authentication within the geospatial boundary;
    upon the first mobile device authenticating the second mobile device within the geospatial boundary, the first mobile device and the second mobile device performing operations while the first mobile device and the second mobile device are within the geospatial boundary;
    wherein the geospatial boundary is defined with a geometric shape and a size, and the geospatial boundary is not defined as surrounding the first mobile device or the second mobile device; and
    wherein the method that the first mobile device determines if the second mobile device is a peer eligible for authentication comprises, the second mobile device sending a signal that includes a geospatial position of the second mobile device to a control agent;

wherein the control agent is a known trusted device and is enabled to use the geospatial position of the second mobile device to perform position calculations to determine that the second mobile device is within the geospatial boundary, determine that the first mobile device and the second mobile device are peers, update a first contact list including identifying information of the first mobile device and a second contact list including identifying information of the second mobile device, and sending the second contact list to the first mobile device and the first contact list to the second mobile device, all while enabling the first mobile device and the second mobile device to remain anonymous until a trusted authentication is established between the first mobile device and the second mobile device;

the first mobile device determining that the second mobile device is a trusted peer by recognizing that the control agent has already determined that the second mobile device is a trusted peer;

the first mobile device transmitting a first encrypted signal to the second mobile device and the second mobile device transmitting a second encrypted signal to the first mobile device, wherein the first encrypted signal includes a high fidelity position of the first mobile device and a unique identification information of the first mobile device and the second encrypted signal includes a high fidelity position of the second mobile device and a unique identification information of the second mobile device;

the first mobile device using the high fidelity position the second mobile device to determine that the second mobile device is still within the geospatial boundary;

and the first mobile device and the second mobile device each updating its respective contact list to finalize authenticated access with each other enabling the first mobile device and the second mobile device to transmit signals directly to each other.

9. The method of claim 8, wherein the geospatial positioning technique includes a high fidelity positioning technique including a geospatial positioning system capable of transmitting an absolute position of a mobile device.

10. The method of claim 8, wherein the geospatial position technique includes a low fidelity technique including the use of an Internet protocol ("IP") address used to calculate a relative position of the second mobile device or signal triangulation with a cell phone triangulation.

11. The method of claim 8, wherein the first mobile device determines that the second mobile device is within the geospatial boundary when the first mobile device and the second mobile device are using a common resource.

12. The method of claim 8, wherein the first mobile device determines that the second mobile device is within the geospatial boundary when the first mobile device and the second mobile device can each detect a same sensory feature, wherein the same sensory feature is also located within the geospatial boundary.

13. The method of claim 8, wherein the shape or the size of the geospatial boundary is changed based on a parameter including a date, duration, frequency, temperature, or detection of malicious activity.

14. The method of claim 8, wherein the operation comprise electronically gathering, storing, processing, transferring, or purging data.

15. A method for authenticating access between a second mobile device that enters a geospatial boundary that moves relative to and surrounds a first mobile device comprising:

the first mobile device keeping track of the physical position of the second mobile device using a geospatial positioning technique;

enabling the first mobile device to determine if the second mobile device is within the geospatial boundary that moves relative to the first mobile device;

enabling the first mobile device to determine if the second mobile device is a peer eligible for authentication;

upon the first mobile device authenticating the second mobile device, the first mobile device and the second mobile device performing an operation while the second mobile device is within the geospatial boundary;

wherein the a geospatial boundary is defined with a geometric shape and size; and wherein the method that the first mobile device determines if the second mobile device is a peer for authentication comprises, the second mobile device sending a signal that includes a geospatial position of the second mobile device to a control agent;

wherein the control agent is a known trusted device and is enabled to use the geospatial position of the second mobile device to perform position calculations to determine that the second mobile device is within the geospatial boundary, determine that the first mobile device and the second mobile device are peers, update a first contact list including identifying information of the first mobile device and a second contact list including identifying information of the second mobile device, and sending the second contact list to the first mobile device and the first contact list to the second mobile device, all while enabling the first mobile device and the second mobile device to remain anonymous until a trusted authentication is established between the first mobile device and the second mobile device;

the first mobile device determining that the second mobile device is a trusted peer by recognizing that the control agent has already determined that the second mobile device is a trusted peer;

the first mobile device transmitting a first encrypted signal to the second mobile device and the second mobile device transmitting a second encrypted signal to the first mobile device, wherein the first encrypted signal includes a high fidelity position of the first mobile device and a unique identification information of the first mobile device and the second encrypted signal includes a high fidelity position of the second mobile device and a unique identification information of the second mobile device;

the first mobile device using the high fidelity position of the second mobile device to determine that the second mobile device is still within the geospatial boundary;

and the first mobile device and the second mobile device each updating its respective contact list to finalize authenticated access with each other enabling the first mobile device and the second mobile device to transmit signals directly to each other.

16. The method of claim 15, wherein the geospatial positioning technique includes a high fidelity positioning technique including a geospatial positioning system capable of transmitting an absolute position of a device.

17. The method of claim 15, wherein the geospatial position technique includes a low fidelity technique including the use of an Internet protocol ("IP") address used to calculate a relative position of the mobile device or signal triangulation with a cell phone triangulation.

18. The method of claim 15, wherein the first mobile device determines that the second mobile device is within the geospatial boundary when the first mobile device and the second mobile device are using a common resource.

19. The method of claim 15, wherein the first mobile device determines that the second mobile device is within the geospatial boundary when the first mobile device and the second mobile device each detect a same sensory feature; wherein the same sensory feature is also located within the geospatial boundary.

20. The method of claim 19, wherein the first mobile device and the second mobile device are each equipped with an image sensor enabled to detect a same visual feature.

21. The method of claim 15, wherein the first mobile device and the second mobile device are each equipped with a sensory detection system enabled to detect a same sensory feature.

\* \* \* \* \*